United States Patent Office 3,424,308
Patented Jan. 28, 1969

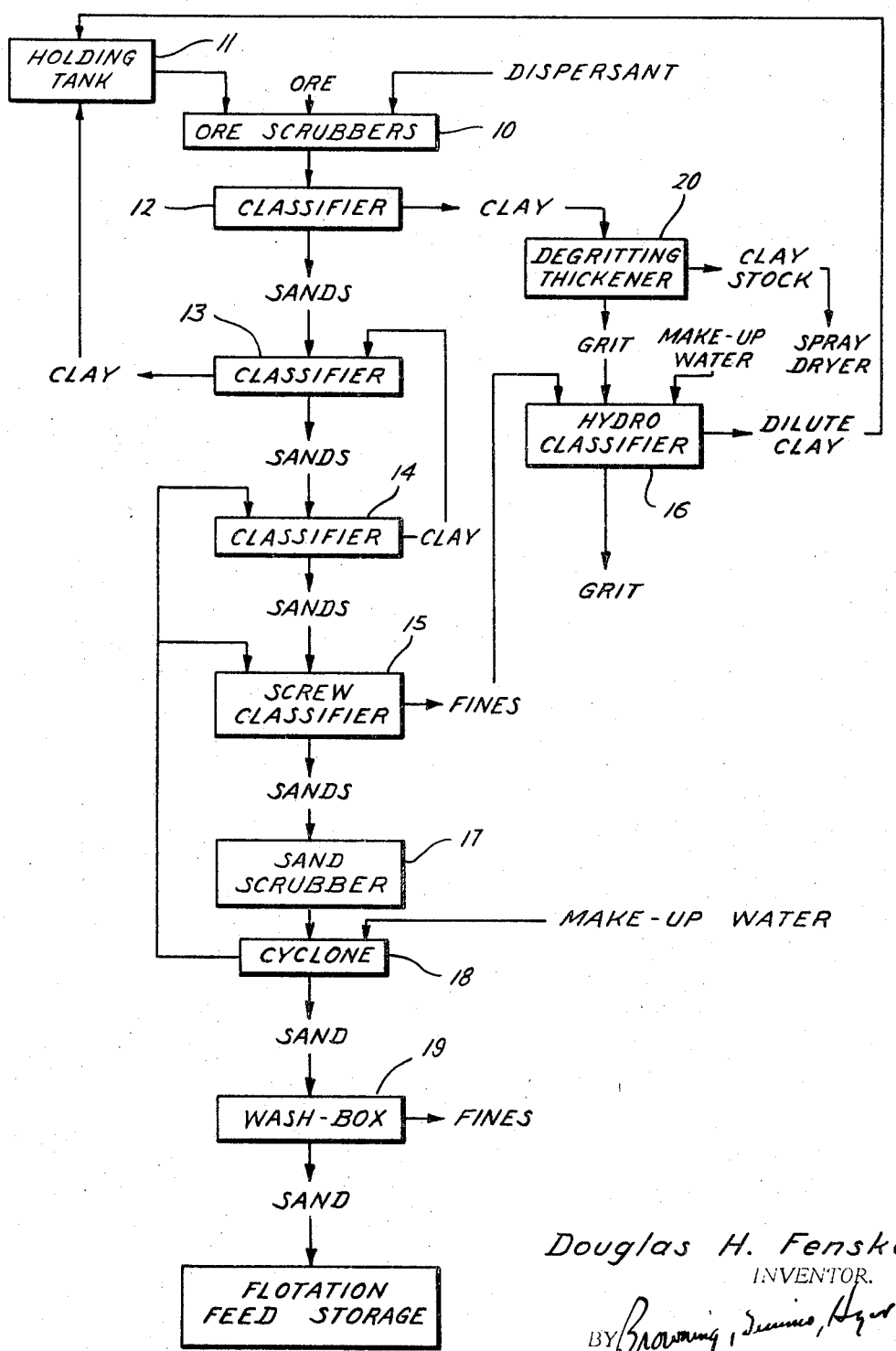

3,424,308
RECOVERY OF CLAY AND SAND FROM AN ORE
Douglas H. Fenske, Marlin, Tex., assignor, by mesne assignments, to Dresser Industries, Inc., Dallas, Tex., a corporation of Delaware
Filed Nov. 9, 1965, Ser. No. 506,927
U.S. Cl. 209—3          5 Claims
Int. Cl. B03b 1/00

ABSTRACT OF THE DISCLOSURE

An ore consisting essentially of silica sand and clay is treated in a series of hydraulic classification steps to produce a high clay content stock suitable for direct spray drying without intermediate filtration and a sand fraction suitable for further processing by flotation. The feed ore is slurried with a controlled amount of clay slurry, prior to classification, to obtain a clay fraction from the first classification zone having at least 40% by weight of clay.

---

This invention relates to a process for recovering clay and sand from an ore containing both clay and sand by a series of hydraulic classifications conducted in such a manner that the resulting clay fraction can be dried without any filtering of the same.

Some clay-sand ore bodies exist which contain a higher percentage of sand than clay. For example, some such ores may contain 25 to 35 parts of clay and 75 to 65 parts of sand. The usual process for separating the clay from such an ore would be by successive stages of washing and classification from which a clay slurry containing 20 to 25% of clay solids would be recovered containing about 90% of the desired clay fraction in the ore. The cost of filtering before drying, or direct drying, would make it uneconomical to process the clay in this manner.

The value of a sand, such as a glass sand, recovered from the ore cannot economically justify a normal process for clay recovery because of the relatively low value of the sand and clay.

If the clay fraction from such an ore as described can be separated from the sand while controlling the clay content of the final clay fraction to be 40% or more while at the same time recovering more than 75% of the clay in the original ore, then the clay fraction can be economically dried without resorting to costly flocculation and filtering steps.

Accordingly, it is an object of this invention to provide a process for recovering clay and sand from an ore containing a minor proportion of the clay in such a manner that the recovered clay fraction has at least 40% of clay solids so that it can be economically dried and so that a major proportion of the clay in the original ore is recovered.

Another object is to provide such a process in which the clay fraction to be dried has a sufficiently high clay solids content that it can be economically dried without resorting to flocculation or filtering steps.

Another object is to provide such a process in which the ore is slurried with a clay slurry before being hydraulically classified and the amount of clay solids added as the clay slurry is controlled so that the first clay fraction obtained in the first hydraulic classification of the ore contains at least 40 weight percent of clay solids which is a greater percentage of clay solids than would be obtained had the ore been slurried originally with water alone.

Other objects, advantages and features of the invention will be apparent to one skilled in the art from a consideration of the specification, the claims and the drawing wherein there is illustrated a schematic flow diagram of a process embodying the invention.

Referring to the drawings, the raw ore is slurried in conventional ore scrubbers 10 with a clay slurry from a holding tank 11. Also, a suitable dispersant can be added at the scrubbers, such as sodium silicate added at the rate of 0.6 pound per ton of dry ore. In the scrubbers, the clay particles become dispersed and separated, to a large degree, from adherence to the sand particles. The resulting ore slurry is then passed to a first hydraulic classifier 12 which preferably is of the gravity type so that, by gravity separation, there results a clay fraction and a sand fraction. This sand fraction is then passed to a second hydraulic classifier 13 where it is mixed with a clay fraction obtained from a third hydraulic classifier 14 and a gravity separation is made. The resulting sand fraction from the classifier 13 is then passed to the third classifier 14 where a gravity separation is again made to provide a further sand fraction and a clay fraction which, as aforesaid, is passed to classifier 13. The sand fraction from the third classifier can then be suitably treated for further desliming so as to provide a suitable flotation feed product. Thus as shown in the drawings, this sand fraction is passed to a screw classifier 15 wherein fines can be separated which can then be passed to a hydro classifier 16. The resulting sand fraction from the screw classifier can be passed to a high energy sand scrubber 17 wherein clay adhering to the sand particles can be scrubbed therefrom. The resulting scrubbed material is then passed to a cyclone separator 18 along with make-up water. The cyclone separator divides its feed into a deslimed sand product and aqueous slime fraction, a portion of the latter being passed through the screw classifier and the balance to the classifier 14 where it is mixed with the sand tailings fed to such classifier. The sand fraction from the cyclone separator can be further deslimed by passing it through a wash box 19 to further separate fines therefrom.

From the foregoing it will be seen that the various sand fractions or tailings are passed serially through the plurality of hydraulic classification zones. The clay fractions, on the other hand, are in effect passed counter-currently to the sand fractions through the various hydraulic classification zones. Thus the make-up water, or a portion of it, is fed into the last classification zone and the supernatant clay fraction from that zone is fed to the next preceding classification zone. This feeding of the supernatant clay fraction from one zone to the next preceding zone continues up to and including the second classification zone. The supernatant clay fraction from this zone is fed to the ore scrubbers as at least a part of the clay slurry which is employed to form the ore slurry.

In the illustrated embodiment, the supernatant clay fraction from the first zone 12 is passed to a degritting thickener 20 which separates out any grit which may be contained in this fraction. The resulting clay fraction then can be passed to a suitable drier, such as a spray drier. If desired, the grit from the degritting thickener can be passed to the hydro classifier 16 which washes out any clay which may be contained in the grit fraction. If desired, make-up water can be added to the hydro classifier. At any rate, the resulting dilute clay fraction can be passed to the holding tank 11 where it is mixed with the clay fraction from the second classification zone 13.

By controlling the amount of clay solids in the clay slurry being added to the ore scrubbers, the amount of clay solids in the supernatant clay fraction from the first classification zone 12 can be controlled. For example, by increasing the amount of clay solids in the clay slurry, the amount of clay solids in the clay fraction can be increased or vice versa. The amount of clay solids in the clay slurry can be controlled by adjusting the amount of make-up water added at the cyclone separator (or alternatively, added directly to classification zone 14) relative to the amount of make-up water added to the hydro classifier 16 (or alternatively, added directly to the holding tank 11).

The amount of make-up water and its point or points of addition will be dependent upon the particular ore being processed and other operating conditions which can be readily determined by one skilled in the art after reading this disclosure. Wherever added, the amount added is such as to control the percentage of clay solids in the clay slurry passing to the ore scrubbers so that the supernatant clay fraction from the first classification zone 12 is of clay content of at least 40 weight percent, and preferably at least 45 weight percent, so that the same can be economically dried without having first to be flocculated or filtered. By controlling the amount of clay solids in the clay slurry, the resulting clay fraction will have a substantially higher clay content than it would have had if the ore had been slurried with water alone.

One particular ore found especially amenable to this process is a kaolin-glass sand ore. One particular ore found in Limestone County, Texas, contains from 25 to 30% kaolin and from 75 to 70% glass sand. However, other clay-sand ores can be treated by this process to recover both clay and sand. The principal qualification of the ore is that the clay particles and the sand particles contained therein be of sufficiently different size that they can be separated in a hydraulic classifier. Most clays, e.g., kaolin, will have a particle size not greater than 325 mesh and, for kaolin, usually 95 to 98% of the kaolin in the raw ore is −325 mesh. The great bulk of the kaolin will be −5 micron in size. Sand, on the other hand, is much coarser and in many instances, will be at least +150 mesh.

EXAMPLE I

An ore sample was obtained from Limestone County, Texas which contained approximately 30% kaolin of −325 mesh and 70% glass sand of +325 mesh. A portion of the ore sample was blunged for 30 minutes with 0.6 pound of sodium silicate dispersant per ton of dry ore and sufficient water to make a slurry of 60% solids. The sample was allowed to settle and the supernate siphoned off to a depth corresponding to 10 minutes settling time per foot of supernate withdrawn. The supernate and tailings were then dried. A similar test was performed under the same conditions, only the amount of water was decreased to give a slurry containing 68% solids. The results are shown in Table I below.

and designated secondary clay and tertiary clay, respectively. Twelve portions of 1030 grams each were cut from the ore sample used in Example I. To the first ore sample was added 620 cc. of secondary clay (22% solids) which gave 1016 cc. of slurry at 68% solids. This mixture was blunged for 30 minutes with 0.6 pound of sodium silicate per ton of ore. After a settling period equivalent to 20 minutes per foot of supernate, the supernate was siphoned off, designated primary clay, and sufficient tertiary clay (11% solids) added to the settled sand to bring back the slurry to its original volume. This mixture was agitated and then allowed to settle for a period equivalent to 10 minutes per foot of supernate and the supernate, designated secondary clay, was siphoned off. Again the volume of the settled sand fraction was increased to the original volume (1016 cc.) by adding water, mixed and settled for a time equivalent to 10 minutes per foot of supernate and the supernate, designated tertiary clay, was siphoned off leaving a washed sand settled fraction. The primary clay and washed sand were analyzed separately for precent solids, percent plus and minus 325 mesh, and the percent of −325 mesh in the ore recovered in this primary clay was calculated.

The above procedure was repeated six additional times to demonstrate reproducability of the results. The results of the six tests are set out below in Table II.

TABLE II

| Test cycle | Product | Percent recovery [1] | Percent by size | | Percent −325 mesh recovered | Percent solids in products before drying |
|---|---|---|---|---|---|---|
| | | | +325 | −325 | | |
| 3 | Primary clay | 28.7 | 4.7 | 95.3 | 89.3 | 46.3 |
| | Washed sand | 71.3 | 95.4 | 4.6 | | 70.0 |
| 4 | Primary clay | 28.2 | 4.1 | 95.9 | 90.9 | 45.7 |
| | Washed sand | 71.8 | 96.2 | 3.8 | | 71.0 |
| 5 | Primary clay | 28.2 | 5.9 | 94.1 | 89.8 | 49.6 |
| | Washed sand | 71.8 | 95.8 | 4.2 | | 69.8 |
| 6 | Primary clay | 29.5 | 7.0 | 93.0 | 89.9 | 47.3 |
| | Washed sand | 70.5 | 95.6 | 4.4 | | 69.3 |
| 7 | Primary sand | 27.5 | 9.0 | 91.0 | 88.6 | 48.0 |
| | Washed sand | 72.5 | 95.6 | 4.4 | | 69.9 |
| 8 | Primary clay | 28.9 | 5.7 | 94.3 | 88.6 | 46.7 |
| | Washed sand | 71.1 | 95.1 | 4.9 | | 69.6 |

[1] Percentage of the clay and sand present in original ore which was recovered in the primary clay and sand fractions (dry solids basis).

EXAMPLE III

The ore described in Example I was fed to a production plant operating in accordance with the flow sheet of FIG. 1. Samples from various streams were taken and analyzed with the results as follows:

TABLE III

| Test | Percent solids before drying | | | Percent of −mesh material in original ore recovered in primary clay (dry basis) |
|---|---|---|---|---|
| | Ore slurry | Primary clay | Secondary clay | |
| 1 | 68.0 | 49.0 | 29.3 | 90.1 |
| 2 | 68.7 | 49.3 | 30.8 | 82.7 |
| 3 | 67.5 | 48.5 | 30.6 | 88.9 |
| 4 | 68.7 | 50.4 | 29.3 | 65.4 |
| 5 | 68.0 | 46.5 | 29.8 | 79.2 |

The primary clay was sampled from the supernatant clay

TABLE I

| Test | Percent solids ore slurry | Product | Percent Recovery [1] | Percent by size | | Percent −325 distribution [2] | Percent solids in supernate and tailings |
|---|---|---|---|---|---|---|---|
| | | | | +325 | −325 | | |
| 1 | 60 | Primary clay | 18.2 | 2.1 | 97.9 | 60.0 | 33.8 |
| | | Washed sand | 81.8 | 85.5 | 14.5 | 40.0 | 73.5 |
| 2 | 68 | Primary clay | 16.1 | 5.3 | 94.7 | 51.0 | 37.2 |
| | | Washed sand | 83.9 | 71.5 | 18.5 | 49.0 | 80.1 |

[1] Percentage of the clay and sand present in original ore which was recovered in the primary clay and sand fractions (dry solids basis).
[2] Percentage of −325 mesh material in original ore which was recovered in primary clay and washed sand fractions, respectively.

The inefficiency of this method of beneficiating this ore to separate the clay therefrom is clearly evident from these test results.

EXAMPLE II

Two portions of the clay supernate from test 1 of the above example were diluted to 22% solids and 11% solids fraction flowing from classifier 12. The secondary clay was sampled from the clay slurry flowing to the ore scrubbers. In this connection, it has been found that when the secondary clay solids is at least 22% solids, the percent solids in the primary clay will be at least 45%. Thus by adjusting the percent solids in the clay slurry passing to the ore scrubbers, the percent of clay solids in the supernatant clay fraction from classifier 12 can be controlled.

All percentages herein are weight percentages.

From the foregoing, it will be seen that this invention is one well adapted to attain all of the ends and objects hereinabove set forth, together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. The process of recovering both clay and sand fractions from an ore consisting essentially of clay and sand and containing a higher percentage of sand than clay, said process comprising the steps of:
    (a) forming a slurry of said ore by adding a clay slurry thereto;
    (b) controlling the amount of clay solids added as a part of said clay slurry to ore to be such that the first clay fraction identified below contains at least 40 weight percent of clay which is a greater percentage of clay solids than would be present in such clay fraction had the ore been slurried with water alone;
    (c) hydraulically classifying said ore slurry in a first zone to obtain a first sand fraction and a first clay fraction;
    (d) hydraulically classifying said first sand fraction in a second zone to obtain a second sand fraction and a second clay fraction;
    (e) hydraulically classifying said second sand fraction in a third zone to obtain a third sand fraction and a third clay fraction;
    (f) passing said third clay fraction to said second zone and mixing it with said first sand fraction;
    (g) withdrawing said third sand fraction and washing for subsequent flotation treatment;
    (h) degritting said first clay fraction to form a clay stock product; and
    (j) directly drying said clay stock product.

2. The process of claim 1 wherein said clay stock product is spray dried.

3. The process of claim 1 wherein the amount of clay solids added as clay slurry to the ore is such that said first clay fraction contains at least 45 weight percent of clay.

4. The process of claim 1 wherein said ore contains about 25 to 30 weight percent of clay and about 70 to 75 weight percent of sand.

5. The process of claim 1 wherein said clay slurry contains at least about 22 weight percent of clay.

References Cited

UNITED STATES PATENTS

| | | | |
|---|---|---|---|
| 667,222 | 2/1901 | Ivery | 209—5 |
| 2,085,537 | 6/1937 | Lyons | 209—2 X |
| 2,179,154 | 11/1939 | Lyons | 209—12 |
| 3,037,624 | 6/1962 | Jackson | 209—12 X |
| 3,102,855 | 9/1963 | Brown | 209—12 X |

FRANK W. LUTTER, *Primary Examiner.*

U.S. Cl. X.R.

209—10, 11, 12